(No Model.)

2 Sheets—Sheet 1.

E. L. ORCUTT.
CONFECTIONERY DROPPER.

No. 302,017.　　　　　　　　Patented July 15, 1884.

Witnesses.
Lauritz V. Miller.
John R. Snow.

Inventor:
Edw. L. Orcutt,
by his attorney,
J. E. Maynadier.

(No Model.) 2 Sheets—Sheet 2.

E. L. ORCUTT.
CONFECTIONERY DROPPER.

No. 302,017. Patented July 15, 1884.

Witnesses.
Lauritz N. Möller.
John R. Snow.

Inventor.
Edw. L. Orcutt
by his attorney,
J. E. Maynadier

N. PETERS, Photo-Lithographer, Washington, D. C.

UNITED STATES PATENT OFFICE.

EDWARD L. ORCUTT, OF SOMERVILLE, MASSACHUSETTS.

CONFECTIONERY-DROPPER.

SPECIFICATION forming part of Letters Patent No. 302,017, dated July 15, 1884.

Application filed November 15, 1883. (No model.)

*To all whom it may concern:*

Be it known that I, EDWARD L. ORCUTT, of Somerville, in the county of Middlesex and State of Massachusetts, have invented a new and useful Confectionery-Dropper, of which the following is a specification.

My invention relates to mechanism for making the round cakes of medicated or flavored sugar, known as "drops."

The object of my invention is to provide means for maintaining the prepared sugar at the temperature requisite to cause it to flow freely for any desired length of time, and for making drops more rapidly, better, and cheaper than they can be made by methods heretofore used.

My invention consists in a holder for the prepared sugar, provided with means for keeping its contents at the proper temperature, and with one or more valves arranged to be opened and closed, and in a conveyer for the drop-receivers adapted to be moved as desired, substantially as hereinafter fully described, reference being had to the accompanying drawings, in which—

Figure 1:
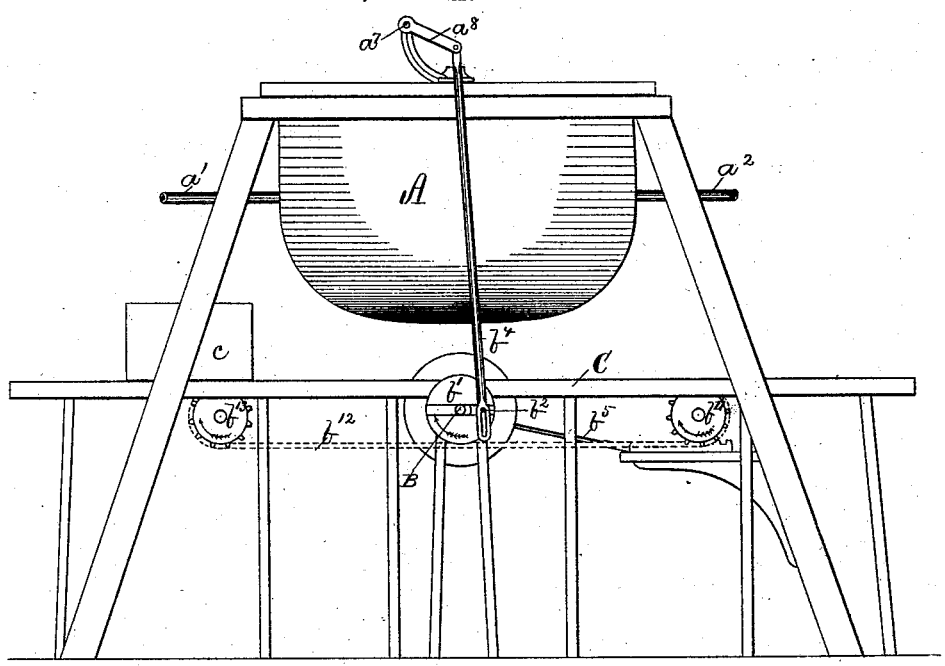
Figure 2:
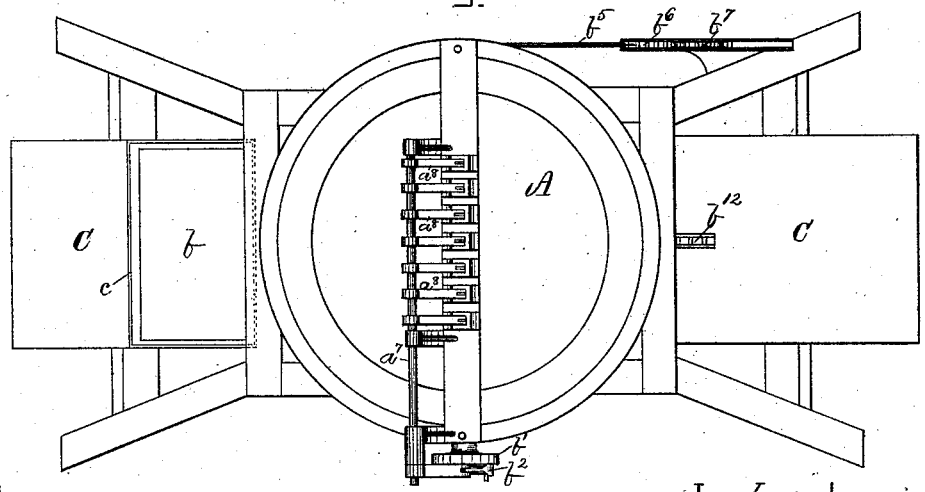
Figure 3:
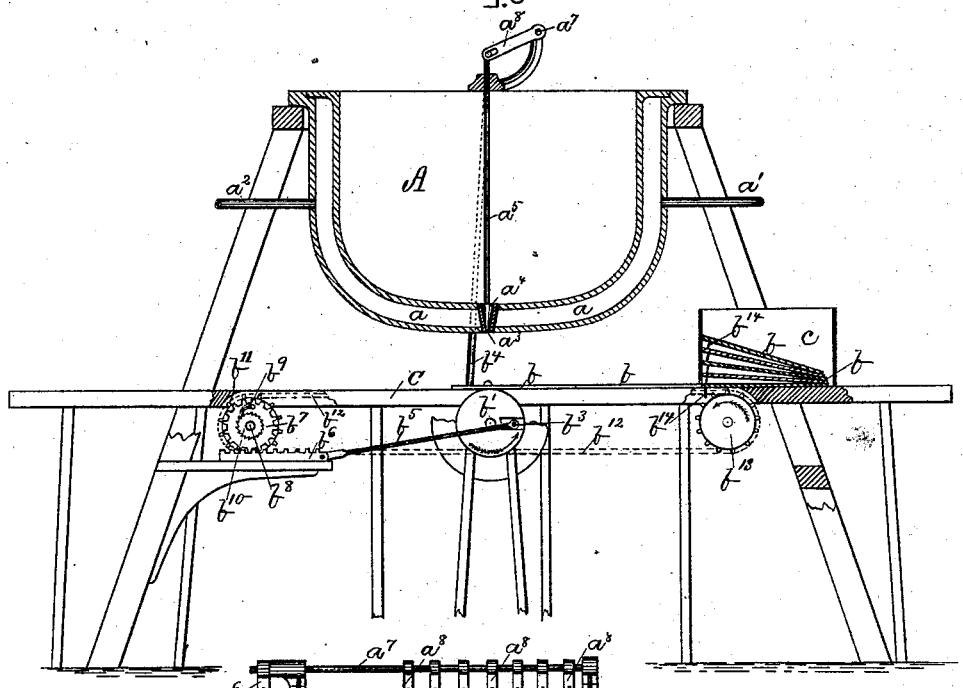
Figure 4:
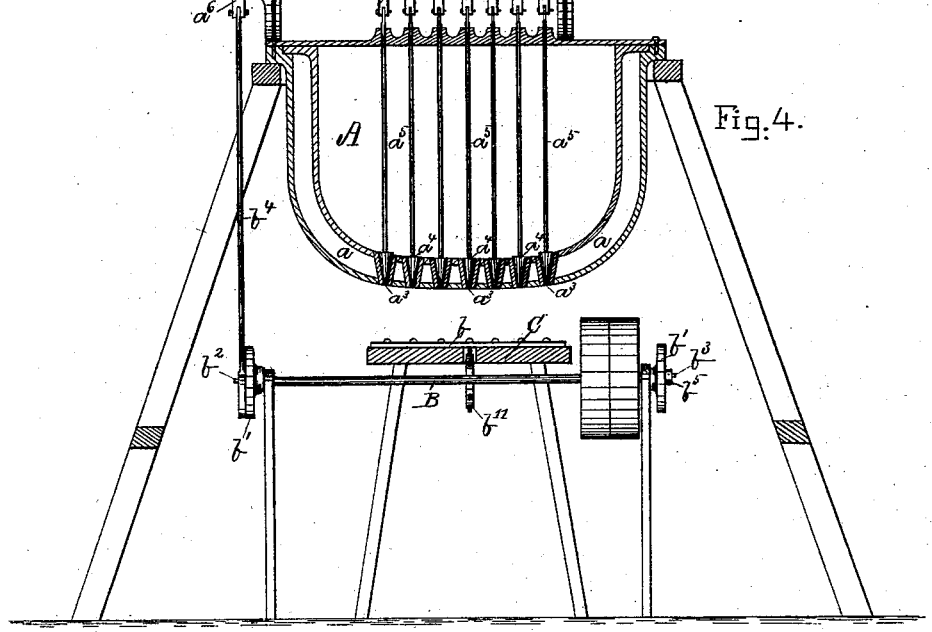

Figure 1 is a side elevation, Fig. 2 is a plan, Fig. 3 a longitudinal section, and Fig. 4 a cross-section, of a machine embodying my invention arranged in the best way now known to me.

A kettle, A, is supported on a suitable frame, and is provided with a steam-jacket, $a$, and pipes $a'$ $a^2$, for admitting and discharging the steam. As many openings $a^3$ as convenient (seven being shown in the drawings) are made in the bottom of the kettle A. Each opening is provided with a valve, $a^4$, which is connected to suitable mechanism for opening and closing it, to allow enough of the prepared sugar to form the desired drop to pass. It is obvious that the valves $a^4$ may be on the outside of the kettle A, and be reciprocated like slide-valves. As the drops fall, they are caught by tins $b$ or the like, moved to receive them. I prefer to move the tins $b$ intermittently, so as to have them at rest when the drops fall, and therefore the movement of the valves $a^4$ is alternated with a forward movement of the tins by suitable mechanism.

In the machine shown in the drawings, a shaft, B, adapted to be revolved by any suitable connection, is provided with face-plates $b'$, grooved to receive crank-pins $b^2$ $b^3$. By means of the grooves the crank-pins may be adjusted toward and from the center of the shaft B, so as to vary their stroke as desired. The crank-pin $b^2$ is connected by a rod, $b^4$, to an arm, $a^6$, fast to a shaft, $a^7$, capable of being rocked in its bearings. To this shaft $a^7$ arms $a^8$ are secured. These arms $a^8$ are connected to the valves $a^4$ by means of the rods $a^5$. The crank-pin $b^3$ is connected by means of the rod $b^5$ to a rack, $b^6$, which meshes with a pinion, $b^7$, mounted loosely on a shaft, $b^8$, and carrying a pawl, $b^9$, that engages with a ratchet, $b^{10}$, fast to the shaft $b^8$, whereby the shaft $b^8$ is intermittently revolved, the extent of its movement depending upon the position of the crank-pin $b^3$ in relation to the center of the shaft B. A sprocket-wheel, $b^{11}$, is also fast to the shaft $b^8$, and engages with an endless chain, $b^{12}$, which passes over another sprocket-wheel, $b^{13}$. The chain $b^{12}$ travels in a slot in the table C, and is slightly below the top of the table. The tins $b$ rest on the table C, and are carried along by the chain $b^{12}$ as it is intermittently moved, so as to be brought in proper position to receive the drops, by means of the lugs $b^{14}$ on the tins, which engage with the links of the chain. The table C extends beyond the wheel $b^{11}$ to receive the tins containing the drops from the chain as it bends over the wheel $b^{11}$.

In operation empty tins are laid in a pile in a box, $c$, with their lugs downward, so that the bottom one of the pile shall be caught by the chain as it moves under them. The kettle is filled with prepared hot sugar, which is kept at a temperature to prevent it from becoming thick, or "setting," as it is called, by means of the steam circulating through the jacket around the kettle. The machine being started, the valves are opened and closed to pass the prepared sugar in quantities determined by the desired size of the drops which fall on a tin. The chain is then moved, the tins advanced the desired distance, when they stop, and the valves are again opened and closed. The filled tins are taken off the table as the chain bends over the sprocket-wheel, the tins behind pushing them in, and as soon as the drops have cooled they are emptied and replaced in the pile on the rear end of the chain. The operation continues until all of the prepared sugar in the kettle is made into drops; or it may be continued indefinitely by keeping the kettle supplied. The quick setting of the prepared sugar has heretofore seriously retarded the manufacture of drops, since only small quantities could be taken at a time from a kettle on the fire, and great care had to be taken to prevent setting, and to make the drops comparatively uniform in size. These difficulties are entirely overcome by my dropper, which, when operated mechanically, substantially as shown in the drawings, the motions of the valves and conveyer being properly regulated, automatically performs all the operations necessary to make drops uniform in size with great rapidity.

I do not claim, broadly, a box or holder having discharge-orifices controlled by valves, as such have been used in machines for making cake and confectionery from plastic material which was forced through the discharge-orifices by means of a piston fitting the box or holder. My machine is intended for making peppermint and other drops from liquid material which must be kept heated to enable it to flow freely.

I claim as my invention—

1. In a machine for making confectionery-drops, the combination, with a sugar-holder having one or more discharge orifices and valves operated, as described, for opening and closing the orifices, of means, substantially as described, for keeping the sugar in the holder at the temperature requisite for its free flowing, as and for the purposes set forth.

2. In a confectionery-dropper, the combination, with tins or the like for receiving the drops, of lugs formed on the tins, and an endless chain moved as described, and having its links adapted to engage with the lugs on the tins, substantially as and for the purposes set forth.

3. The combination, substantially as hereinbefore set forth, of a steam-heated kettle, one or more discharge-orifices in the kettle, and a drop-receiver, with mechanism, substantially as described, for opening and closing the orifices and imparting motion to the drop-receiver, for the purposes specified.

E. L. ORCUTT.

Witnesses:
W. A. COPELAND,
JOHN R. SNOW.